United States Patent
Greger et al.

(10) Patent No.: US 6,253,977 B1
(45) Date of Patent: *Jul. 3, 2001

(54) REMOVABLE SEAT COVER FOR A MOTORCYCLE

(75) Inventors: Martin Greger, Karlsfeld; Edgar Heinrich, Freising; David Robb, Munich, all of (DE)

(73) Assignee: Bayerische Motoren Werke Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/086,533

(22) Filed: May 29, 1998

(30) Foreign Application Priority Data

Jul. 1, 1997 (DE) .................. 197 27 909

(51) Int. Cl.⁷ .................. B62J 9/00
(52) U.S. Cl. .................. 224/413; 224/153; 224/275; 224/417; 297/219.11; 297/184.11; 150/167
(58) Field of Search .................. 224/575, 153, 224/155, 584, 627, 628, 629, 275, 413, 417, 427, 637, 638; D12/416; 297/219.11, 188.2, 184.11; 190/2; 150/167

(56) References Cited

U.S. PATENT DOCUMENTS

| | | | |
|---|---|---|---|
| 3,622,056 | * 11/1971 | Droeger | 224/153 |
| 4,003,508 | * 1/1977 | Hoops | 224/413 X |
| 4,059,207 | * 11/1977 | Jackson et al. | 224/417 X |
| 4,154,323 | * 5/1979 | Sneider | 190/2 |
| 4,258,869 | 3/1981 | Hilgendorff . | |
| 4,442,960 | * 4/1984 | Vetter | 224/427 X |
| 4,690,237 | * 9/1987 | Funabashi et al. | 224/413 X |
| 4,733,907 | * 3/1988 | Fellenbaum | 224/427 X |
| 4,792,040 | * 12/1988 | Wagstaff, III | 150/167 X |
| 4,879,768 | * 11/1989 | McClees et al. | 224/264 |
| 4,953,911 | 9/1990 | Hanagan . | |
| 5,405,068 | * 4/1995 | Lovett | 224/153 |
| 5,467,907 | * 11/1995 | Celik | 224/638 X |
| 5,526,969 | * 6/1996 | Greenberger | 224/153 |
| 5,562,236 | * 10/1996 | Monzingo | 224/153 |
| 5,676,288 | * 10/1997 | Spirk | 150/167 X |

FOREIGN PATENT DOCUMENTS

| | | | |
|---|---|---|---|
| 10754 | * of 1910 | (GB) | 297/219.11 |
| 402074480 | * 3/1990 | (JP) | 224/275 |

\* cited by examiner

Primary Examiner—Gregory M. Vidovich
(74) Attorney, Agent, or Firm—Evenson, McKeown, Edwards & Lenahan, P.L.L.C.

(57) ABSTRACT

A removable seat cover is provided for a rear passenger accommodating part of a motorcycle seat. The seat cover is connected with a supporting device in the form of a backpack which allows the seat cover to be worn around a human body so that it cannot be lost when it is not in a rear seat part covering position

11 Claims, 2 Drawing Sheets

REMOVABLE SEAT COVER FOR A MOTORCYCLE

BACKGROUND AND SUMMARY OF THE INVENTION

This application claims the priority of German application 197 27 909.0, filed in Germany on Jul. 1, 1997, the disclosure of which is expressly incorporated by reference herein.

The invention relates to a removable seat cover for the rear part of a motorcycle seat.

It is already known to design the motorcycle seat, especially for sport motorcycles suitable for carrying a passenger, in such fashion that the passenger seat can be covered by a removable seat-cover. This is done for reasons of improved aerodynamics for example. A seat cover of this type that can be mounted and removed is attached by conventional fastening means to the rear and/or to the seat of the motorcycle for example. The motorcycle is used either with or without the seat cover, since no special mount for the seat covering is provided on the vehicle for carrying a passenger.

It is also known to mount a luggage carrier on the passenger seat. German Utility Model G 84 05 268 describes a luggage carrier of this type, which can be mounted releasably to the passenger seat. In both cases it is difficult to carry another person as a passenger on the motorcycle and at the same time not to leave behind the seat covering and/or the luggage carrier that has been removed, but to bring it along as well.

For this reason, a goal of the invention is to design a removable seat cover in such fashion that it can be easily transported in the removed state.

This goal is achieved according to the invention by providing that the seat cover is connected with a supporting device that permits the seat cover to be worn around a human body.

According to the invention, the seat cover is connected to a supporting device that makes it possible to hang it around a human body. This has the advantage that the seat cover can be transported easily in the removed state aboard a motorcycle occupied by two persons.

In a preferred embodiment of the invention, the supporting device is a backpack. Additional luggage can also be stored advantageously in this backpack, and backpack supporting devices are designed so that they can be carried on the human body comfortably and secure against loss.

While in another preferred design of the invention the supporting device is separable from the seat cover, the backpack can also be used as a luggage storage area if the seat covering is mounted on the motorcycle seat with only the driver aboard, but the driver would like to carry luggage in the backpack.

One advantageous embodiment of the invention is characterized by the fact that the supporting device is located in a cavity between the motorcycle seat and the seat covering when the seat covering is fastened to the motorcycle seat. In this manner, the supporting device is stowed invisibly and securely aboard the vehicle.

In another advantageous embodiment of the invention, the seat covering is shaped so that when it is worn, it acts as a protector for part of the body. This has the advantage that the seat covering, when it is worn on the body with the supporting device, offers additional protection if it has a safety-oriented design. Thus, the seat covering can consist for example of a back protector material and can be worn so that optimum protection is ensured.

Other objects, advantages and novel features of the present invention will become apparent from the following detailed description of the invention when considered in conjunction with the accompanying drawings.

DETAILED DESCRIPTION OF THE DRAWINGS

Figure 1:
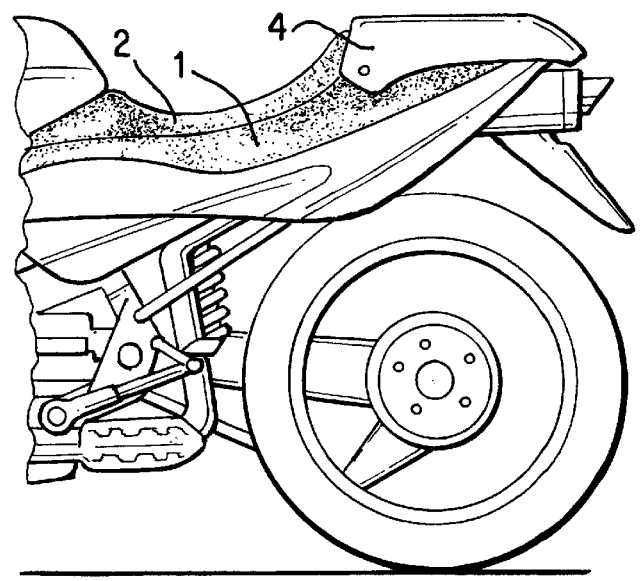
FIG. 1 shows a rear part of a motorcycle with a seat cover, constructed in accordance with a preferred embodiment of the present invention.
Figure 2:
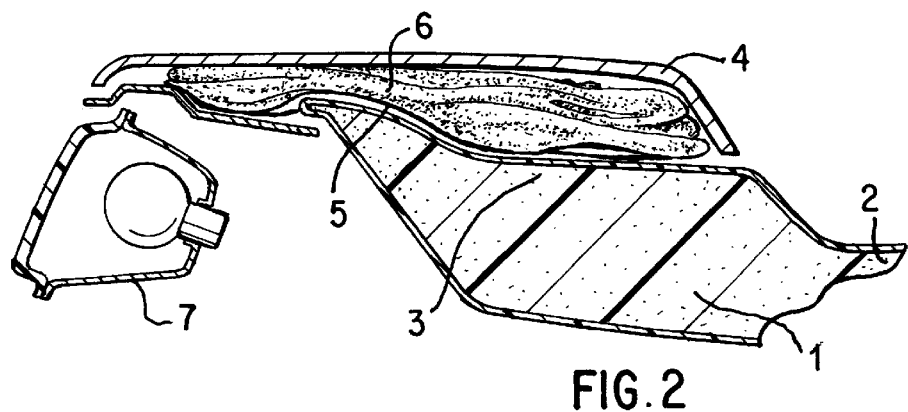
FIG. 2 shows a partial section of the motorcycle of FIG. 1 in the vicinity of the seat cover, with the sides reversed and shown enlarged.

According to FIG. 1, a motorcycle seat 1 is provided with a seat area 2 for a driver and an additional seat area 3 (FIG. 2) for a passenger. This additional seat area 3 for the passenger is covered by a seat cover 4 that is attached by means of conventional fastening means, not shown in greater detail, to motorcycle seat 1 and/or other parts of the motorcycle that are integral with the vehicle. A folded backpack 6 is accommodated in a cavity 5 between the seat cover 4 and the additional seat area 3 for the passenger, with the seat cover 4 being attached to the exterior of said backpack by conventional fastening means not shown in greater detail. This is illustrated in FIG. 2, from which it also follows that seat cover 4 extends rearward beyond the additional seat area 3 for the passenger, into the vicinity of a tail light 7.

Figure 3:
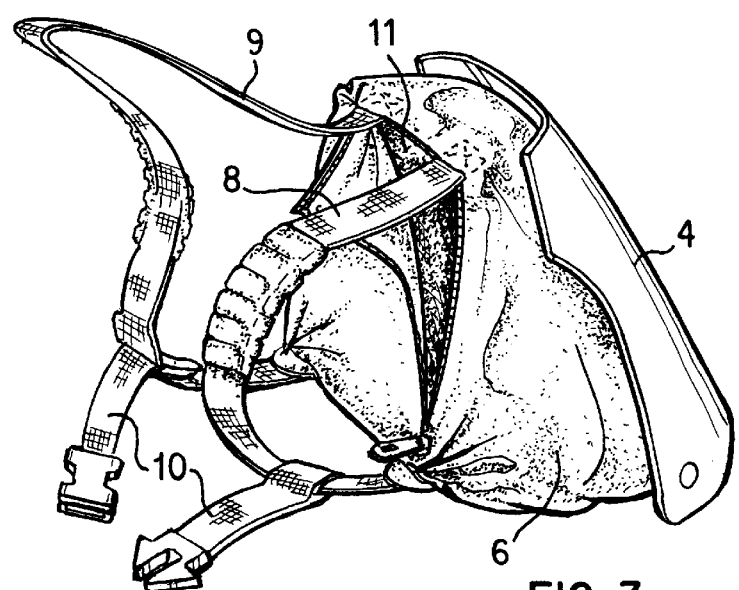
FIG. 3 and 4 show the seat cover of the embodiment of FIGS. 1 and 2 removed from the motorcycle with its supporting device and the seat cover separated from the supporting device.
Figure 4:
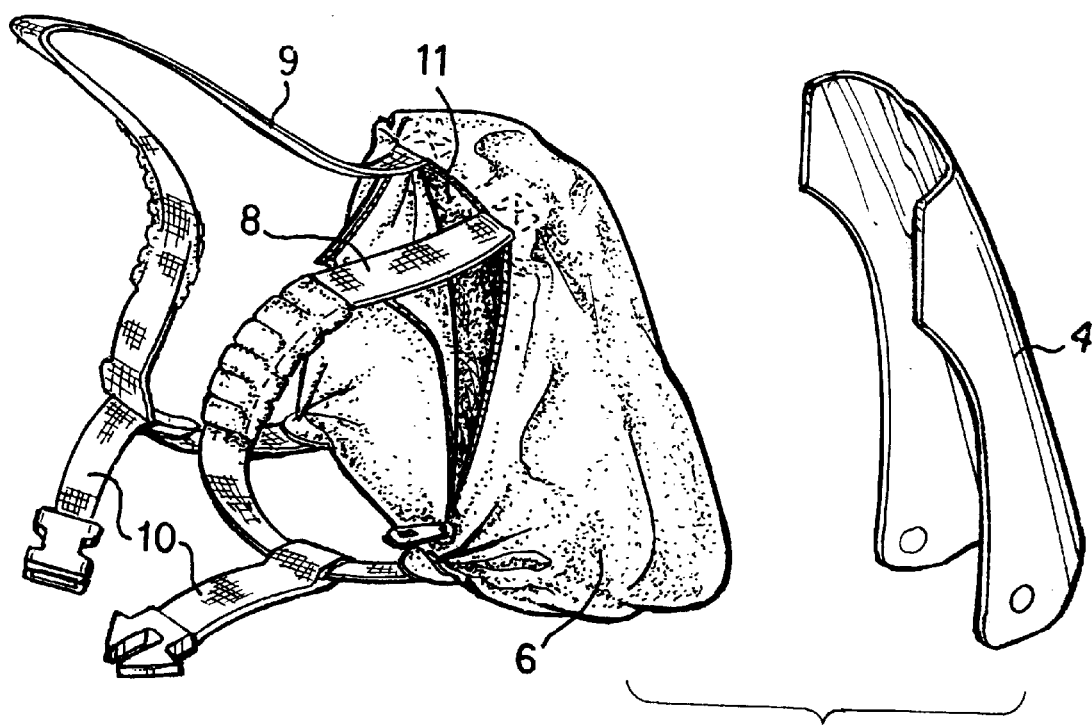

FIG. 3 shows the seat cover 4 removed from the motorcycle seat 1 and fastened to the outside of backpack 6. Backpack 6 is unfolded and has two shoulder belts 8, 9 and a divided chest belt 10 for secure fastening to the body, not shown, of the driver, not shown, or the passenger, likewise not shown. In addition, backpack 6 also has a closable opening 11 for accommodating luggage, not shown. In preferred embodiments where the seat cover 4 is suitably designed in terms of both shape and material, it also fulfills the function of a back protector.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motorcycle seat assembly comprising:
    a motorcycle seat with a front seat part for a motorcycle driver and a rear seat part for a motorcycle passenger,
    a detachable seat cover for selective attachment to said rear seat part for selectively covering the rear seat part when said driver is present but when no passenger is present,
    a cavity between the rear seat part and the detachable seat cover, and
    a supporting device located in said cavity when said seat cover is in a position covering the rear seat part, said supporting device connected with the seat cover and configured so that the seat cover can be worn by one of the driver and passenger when not in a rear seat part covering position.

2. A motorcycle seat assembly comprising:
- a motorcycle seat with a front seat part for a motorcycle driver and a rear seat part for a motorcycle passenger,
- a detachable seat cover for selective attachment to said rear seat part for selectively covering the rear seat part when no passenger is present
- a supporting device connected with the seat cover and configured so that the seat cover can be worn by one of the driver and passenger when not in a rear seat part covering position wherein the supporting device is a backpack with flexible shoulder straps.

3. A motorcycle seat assembly according to claim 2, comprising a cavity between the seat cover and the rear seat part which accommodates said supporting device when said seat cover is in a position covering the rear seat part.

4. A motorcycle seat assembly according to claim 2, wherein the seat cover is shaped in such fashion and/or is wearable in such fashion that when it is worn, it acts as a protector for a part of the body.

5. A motorcycle seat assembly comprising:
- a motorcycle seat with a front seat part for a motorcycle driver and a rear seat Part for a motorcycle passenger,
- a detachable seat cover for selectively covering the rear seat part when no passenger is present,
- a cavity between the rear seat part and the detachable seat cover, and
- a supporting device located in said cavity when said seat cover is in a position covering the rear seat Part, said supporting device connected with the seat cover and configured so that the seat cover can be worn by one of the driver and passenger when not in a rear seat part covering position, wherein the supporting device is a backpack with flexible shoulder straps and a chest belt.

6. A motorcycle seat assembly according to claim 5, wherein the seat cover is shaped in such fashion and/or is wearable in such fashion that when it is worn, it acts as a protector for a part of the body.

7. A motorcycle seat assembly according to claim 5, wherein said seat cover extends above an area accommodating a motorcycle tail light when in position covering the rear seat part.

8. A motorcycle seat assembly according to claim 5, wherein said seat cover is a relatively rigid cover member and said supporting device include flexible foldable structures.

9. A motorcycle seat assembly according to claim 7, wherein said seat cover is a relatively rigid cover member and said supporting device include flexible foldable structures.

10. A motor cycle seat assembly according to claim 5, wherein said seat cover extends above an area accommodating a motorcycle tail light when in position covering the rear seat part.

11. A motor cycle seat assembly according to claim 5, wherein said seat cover is a relatively rigid contoured members.

* * * * *